United States Patent [19]

Korpi

[11] Patent Number: 5,232,236

[45] Date of Patent: Aug. 3, 1993

[54] LEVERAGED HAND PROPELLER FOR A WHEEL CHAIR WITH BRAKE

[76] Inventor: Emil Korpi, 29 Southpine Ct., San Jose, Calif. 95138

[21] Appl. No.: 862,405

[22] Filed: Apr. 2, 1992

[51] Int. Cl.⁵ ............................................ B62M 1/14
[52] U.S. Cl. ............................ 280/250.1; 280/304.1; 297/DIG. 4
[58] Field of Search .................. 280/250.1, 304.1, 244; 297/DIG. 4

[56] References Cited

U.S. PATENT DOCUMENTS

| | | |
|---|---|---|
| 3,189,368 | 6/1965 | Petersen . |
| 3,301,574 | 1/1967 | Good . |
| 3,869,146 | 3/1975 | Bulmer ............................ 280/250.1 |
| 3,877,725 | 4/1975 | Barroza ............................ 280/250.1 |
| 4,354,691 | 10/1982 | Saunders et al. ................. 280/250.1 |
| 4,506,900 | 3/1985 | Korosue ........................... 280/250.1 |
| 4,538,826 | 9/1985 | Lemarie . |
| 4,682,784 | 7/1987 | Anderson ......................... 280/250.1 |
| 4,735,431 | 4/1988 | Tait . |
| 4,762,332 | 8/1988 | Seol ................................ 280/250.1 |
| 4,887,830 | 12/1989 | Fought et al. . |

FOREIGN PATENT DOCUMENTS 2213438  8/1989  United Kingdom ............. 280/250.1
9007316  7/1990  World Int. Prop. O. ........ 280/250.1

Primary Examiner—Margaret A. Focarino
Assistant Examiner—Kevin Hurley
Attorney, Agent, or Firm—Limbach & Limbach

[57] ABSTRACT

A leveraged hand propeller and brake assembly for a wheel chair is described including on each wheel at least one main brace/propeller arm provided with a handle and a tire engaging gripper to rotate the wheel for forward motion and at least one brake arm provided with a brake handle at one end and a brake plug at the other and pivotally connected therebetween to the main brace/propeller arm assembly whereby squeezing of the propeller handle and brake handle together applies braking action to the wheel chair tire. The main brace is provided with an angled flange to limit movement between the propeller arm and the brace to a given angle.

11 Claims, 2 Drawing Sheets

LEVERAGED HAND PROPELLER FOR A WHEEL CHAIR WITH BRAKE

BACKGROUND OF THE INVENTION

1. Field of the Invention

This invention relates in general to wheel chairs and in particular to hand levers designed to move and stop a wheel chair by the occupant with ease.

2. Description of Related Art

The presently used device for moving a manually-operated wheel chair by the occupant is a metal one-half inch circular ring projecting out from the wheel. This is a narrow hand gripping device used to propel the wheel chair and is an improvement over gripping a dirty tire to turn the wheels.

The smaller gripping edge used on conventional wheel chairs is hard on hands and provides very week propulsion, with a great deal of effort.

In addition, U.S. Pat. No. 3,189,368 to J. F. Peterson discloses a driver attachment with a pivotally connected handle assembly for a wheel chair. U.S. Pat. No. 3,301,574 to D. T. Good shows a propelling arrangement including a U-shaped main lever to which is connected a driving lever 34 and with a separate brake handle mounted behind the wheel. U.S. Pat. No. 4,538,826 to R. Lemarie discloses a pair of arms rotatably mounted on a wheel chair axle and a handle operated caliper assembly mounted on the arms to engage the wheels, and U.S. Pat. No. 4,735,431 to R. E. Tait discloses a pair of normal horizontally mounted handles which are pivotally mounted for up and down movement to drive a clutch connected to the drive wheels.

The object of my invention is to provide leverage for greater movement, more power and less effort to propel a wheel chair along with the convenience of propelling handles along with a braking device next to the propelling handle, giving the occupant of the wheel chair improved stopping and turning control.

SUMMARY OF THE INVENTION

Broadly stated, the present invention is directed to a hand propeller for a wheel chair constructed in the form of a pair of main braces rotatably mountable on the wheel chair axles on opposite sides of the wheel and rotatably interconnected with one of the ends of a pair of propeller lever arms, the opposite spaced apart ends of which are connected together by a handle. An elongate tire gripper is pivotally connected to the main brace/lever arm combinations, preferably at the pivotal connection therebetween with the other end of the tire gripper projecting at an angle toward the tire and held at the angle and spaced from the lever arms by at least one propeller bracket. A pair of brake arms are provided which have a handle pivotally connected between one end of the brake arms, a braking plug pivotally connected between the opposite ends of the brake arms and a pivotal connection along the length of the brake arms with the tire gripper such that in normal operation the propeller handle is spaced forwardly of the propeller handle and the brake plug is clear of the wheel tire.

By pushing the propeller lever handle forward, the tire gripper pushes against the tire and thus moves the wheel chair forward. When the occupant pulls back on the handle, the propeller levers rotate relative to the main braces to release the tire gripper from engagement with the wheel allowing the occupant to pull the handle back free from tire engagement to repeat the forward pushing motion.

The occupant by reaching his or her fingers from the propeller handle to the brake handle and squeezing the two handles together forces the brake plug against the tire enabling the occupant to stop or turn the wheel chair. When the handles are not being pressed forward or squeezed together, the propelling lever is disengaged and the wheels are free to move.

In accordance with one embodiment of the present invention, the propeller lever arms and main braces are prevented from rotating relative to one another beyond a given angle at which the tire gripper is clear of engagement with the wheel. When the propeller arms are pushed forward by the handle, the gripper engages the tire.

The present invention has the advantage of providing more leverage and ease of propulsion and braking than the circular ring in current use or the prior art lever devices.

Travelling in a wheel chair equipped with the invention is made faster and easier for the occupant. A wheel chair equipped with this invention will travel faster than a person walking and require less effort to move than the circular ring model by reason of the lever action on the wheels.

Another advantage of my invention is that the upright handles provide a comfortable gripping device for propelling the wheel chair.

In accordance with another aspect of the present invention, a protruding stop bracket is attached to the back rest of the chair and to the forwardly projecting seat support to limit the rotational position of the propelling handles to keep the propelling handles in easy reach of the occupant.

Various features and advantages of the present invention will become more apparent on a perusal of the following specification taken in conjunction with the accompanying drawings wherein similar characters are referenced to similar elements in each of the several views.

DESCRIPTION OF THE PREFERRED EMBODIMENT

Figure 1:
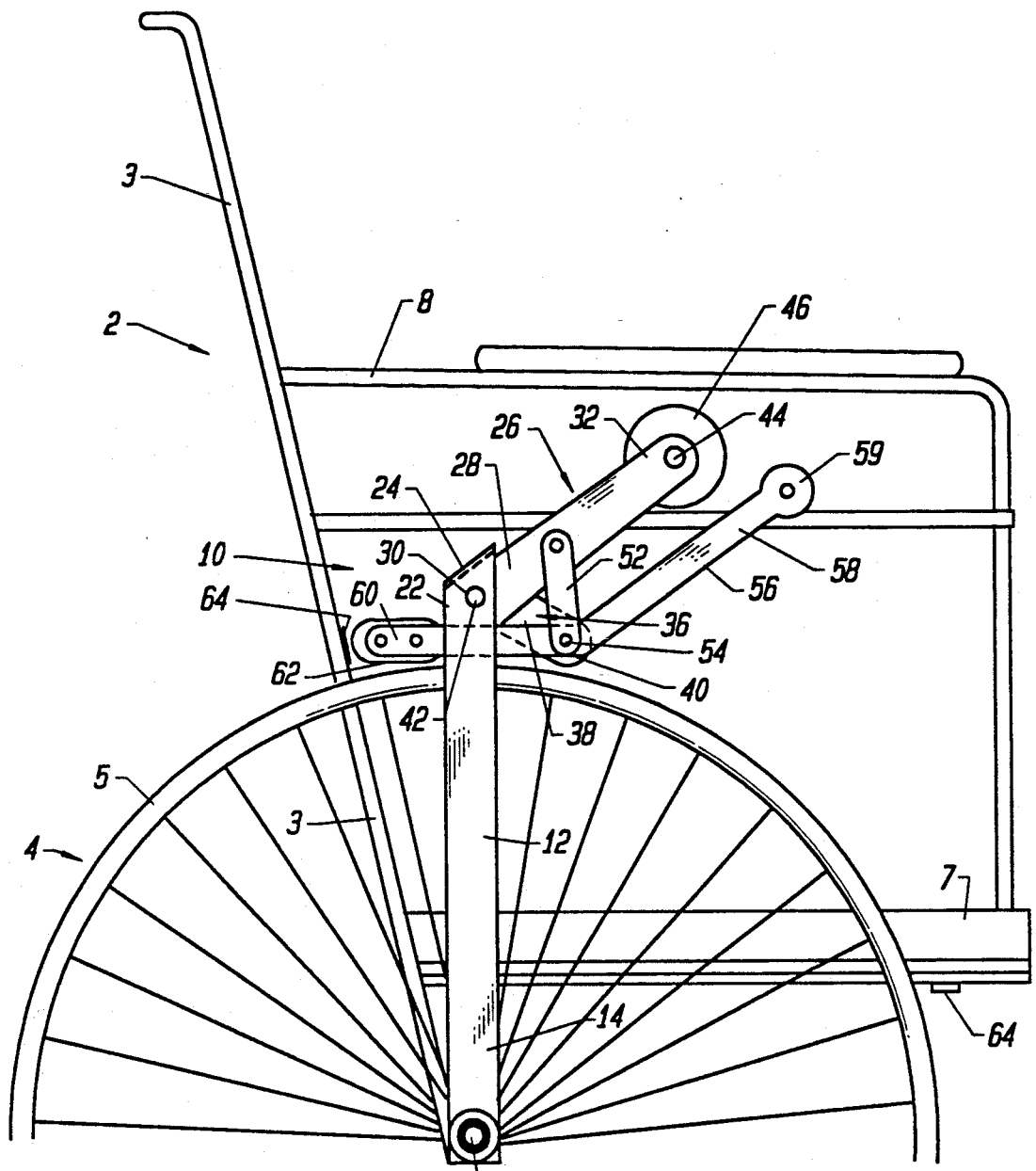
FIG. 1 is a side elevational view of the propelling and braking apparatus of the present invention with the propeller and braking handles in disengaged position.
Figure 4:
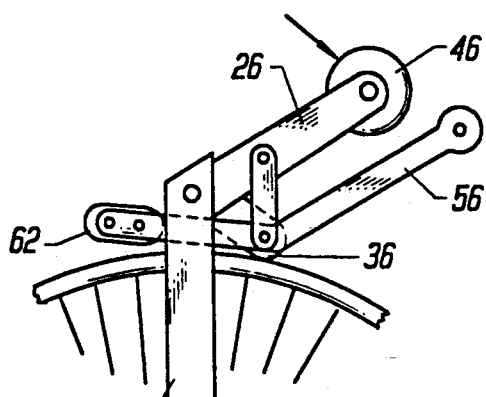
FIG. 4 is a view of a portion of the structure shown in FIG. 1 illustrating action of the assembly to propel the wheel tire.
Figure 5:
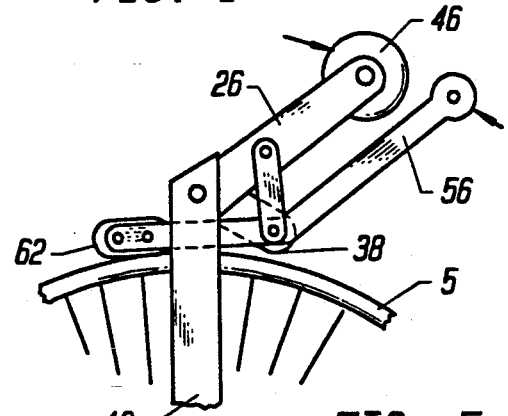
FIG. 5 is a view similar to FIG. 4 illustrating action of the assembly to brake movement of the tire.
Figure 2:
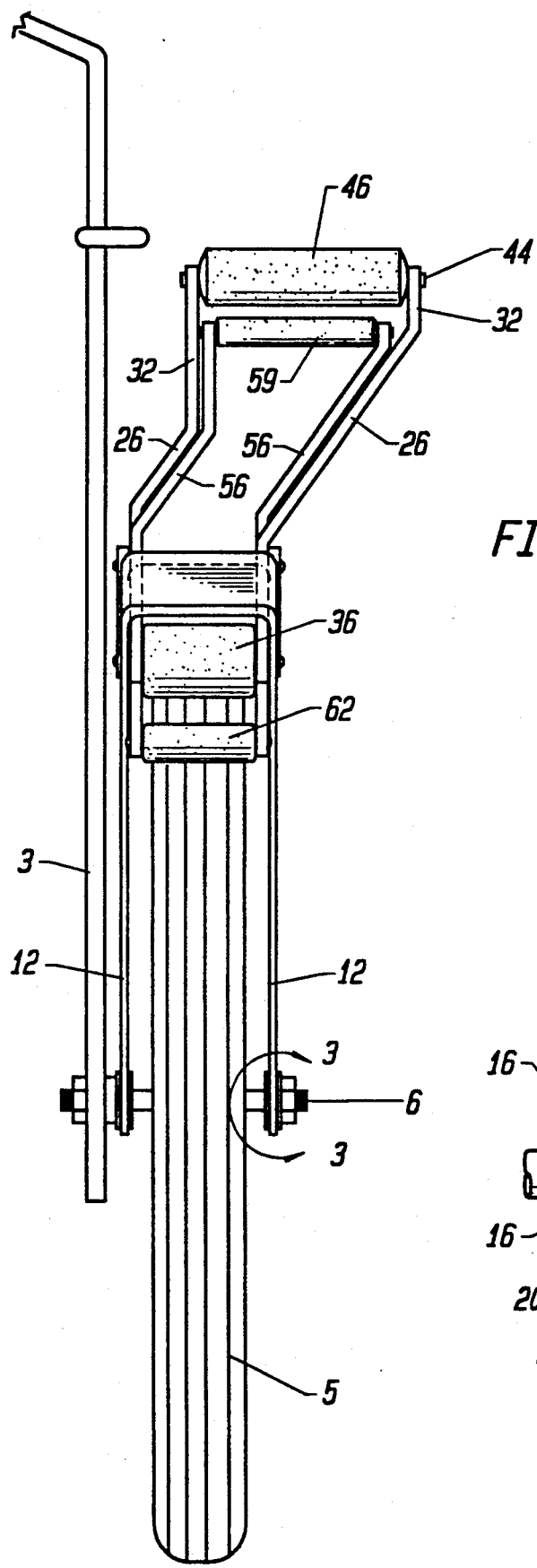
FIG. 2 is a rear elevational view of the structure shown in FIG. 1.
Figure 3:
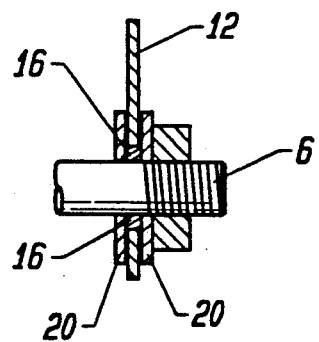
FIG. 3 is an enlarged view of the portion of the structure shown in FIG. 2 delineated by line 33.

Referring now to the drawing with particular reference to FIGS. 1-3, there is shown the leveraged hand propeller assembly 10 in accordance with this invention attached to a conventional wheel chair 2. The wheel chair 2 has the standard main frame and back member 3 to which is mounted a pair of wheels 4 with tires 5 via axles 6 and a seat support member 7 and an arm and arm rest 8.

The hand propeller assemblies 10, one of which is provided on each of the wheels, includes a main brace 12, such as of aluminum, which is freely rotatably mounted through an opening 16 at its lower end 14 on a bushing 18 on the wheel axle 5 between a pair of washers 20. The upper end 22 of each of the braces 12 is provided with an aperture 30 for rotatably mounting a pair of propeller arms 26, such as of aluminum, and also a tire gripper or plug 36, such as of roughened, medium flexible rubber. Apertures are provided through one end 28 of each of the lever arms 26 and through one end 38 of the gripper 36 so that a bolt 42 passes through the apertures 30 in the braces 12 on the outside, then through the apertures in the lever arms 26 inwardly of the braces 12 and then through the gripper 36 between the lever arms. The upper ends of the braces 12 are provided with an angular flange 24 which limits the degree of relative rotation of the lever arms 26 and braces 12 in the upward or counterclockwise direction around the bolt 42.

The other or upper end 32 of each of the lever arms 26 is bent in a direction away from the wheel chair so as to clear the arm rest 7, and the free upper ends 32 of lever arms 26 are connected together via a bolt which extends through the openings 34 and a cylindrical propeller handle 46 positioned between the arms 26.

Each of a pair of propeller bracket 52 is connected at its upper end to one of the lever arms 26 and at its lower end to the free, forward or downward end 40 of the gripper 36 via the bolt 54.

A pair of brake arms 56, each angled substantially midway thereof, are also positioned inbetween the propeller brackets 55 and pivotally connected via bolt 54 to the lower end of the gripper 36. The forward ends 58 of the brake arms 56 are connected together with a handle 59 therebetween, and the reward ends 60 of the brake arms are connected together with a brake plug 62 therebetween.

In the position shown in FIG. 1, the gripper 36 and the brake plug 62 are free from engagement with the wheel tire. To propel the wheel chair forward, the occupant grasps and pushes the propeller handle 46 forward which causes the forward or lower end of the gripper 36 to engage and rotate the wheel chair tire 9 forward. When the occupant pulls back on the propeller handle 46, the gripper 36 is released from engagement with tire 9 and allows the occupant to pull the handle back free to repeat the forward levered pushing motion.

For turning and braking, the second and smaller braking handle 59 is typically positioned about two inches forward of the propelling handle 44. By reaching the occupant's fingers to the braking handle 59 and squeezing the two handles 46 and 49 together, the brake plug 62 is cause to engage the tire 9 and to stop rotation of the wheel. When the handles 46 and 59 are not being pushed forward or squeezed together, the propelling lever arm and the brake arms are disengaged and the wheels are free to move forward or backward.

A stop bracket 54 is mounted from the back frame 3 and another stop bracket is mounted from the seat support member 7 thereby limiting the rotational position of the propelling and braking assembly to the arc between these two bracket stop members.

If desired, a spring or springs can be attached to position the propelling and braking assembly at the arcuate position between the stop brackets 64 most convenient for use by the particular occupant.

The terms and expressions which have been employed here are used as terms of description and not of limitation, and there is no intention, in the use of such terms and expressions, of excluding equivalence of the features shown and described, or portions thereof from the scope of the present invention.

I claim:

1. A hand propeller for a wheel tire mounted on a wheel axle of a wheel chair comprising, in combination:
    at least one main brace having a first end and a second end and an opening adjacent said first end for rotatable attachment to the wheel axle of the wheel chair,
    at least one propeller lever arm having a first end and a second end, said lever arm first end pivotally connected to said second end of said main brace,
    a first propeller handle connected to said second end of said lever arm,
    a first elongate tire gripper having its first end connected at the connection between said main brace and said propeller arm and a second end,
    first means biasing the second end of said gripper away from said lever arm,
    at least one brake arm having first and second ends, said brake arm first end connected to a brake handle and said brake arm second end connected to a brake plug, said brake arm pivotally connected in between its ends to at least one of said tire gripper and said biasing means,
    whereby levered advancement of said propeller arm causes said gripper to engage and rotatably advance the wheel tire and whereby clamping together of said propeller handle and said brake handle causes the brake plug to engage and stop rotation of the wheel tire.

2. The apparatus of claim 1 wherein said first end of said tire gripper is connected to said main brace and said propeller arm at the pivotal connection therebetween.

3. The apparatus of claim 1 wherein said brake arm and said propeller lever arm are pivotally connected together and to said tire gripper at the other end of said tire gripper.

4. The apparatus of claim 1 wherein said propeller lever arm includes an angled flange on the second end thereof limiting movement between said propeller arm and said brace to a given angle.

5. The apparatus of claim 1 including stop brackets connected to the frame of the wheel chair limiting rotational movement of said combination main brace and propeller arm.

6. The apparatus of claim 1 including a second main brace, a second propeller lever arm, a second propeller handle, a second tire gripper, a second biasing means and a second brake arm all connected together as said one brace, said one lever arm, said first propeller handle, said first tire gripper, said first biasing means and said one brake arm for propelling and braking a second wheel of the wheel chair.

7. A hand propeller for a wheel tire mounted on a wheel axle on a frame of a wheel chair comprising, in combination:
    a pair of first main braces, each main brace having a first end and a second end and an opening adjacent said first end for rotatable attachment to the wheel axle of the wheel chair on opposite sides of the wheel and each main brace having an angled flange on said second end, a pair of first propeller lever arms each having a first end and a second end, each said lever arm first end pivotally connected to a said second end of one of said main braces with said angled flange limiting movement between each lever arm and the brace pivotally connected thereto to a given angle, the second ends of said lever arms spaced apart and connected to a first propeller handle extending therebetween, an elongate first tire gripper having its first end connected at the connection between said second ends of said main braces and said first ends of said propeller arms and a second end, at least one first propeller bracket having one end thereof pivotally connected to at least one of said lever arms and the other end thereof pivotally connected to said second end of said tire gripper, a pair of first brake arms having first and second ends, said brake arm first ends spaced apart and connected to a brake handle extending therebetween and said brake arm second ends connected to a brake plug extending therebetween, said brake arm pivotally connected in between said first and second ends to at least one of said tire gripper and said propeller bracket, whereby levered advancement of said propeller arms causes said gripper to engage and rotatably advance the wheel tire and whereby clamping together of said propeller handle and said brake handle causes the brake plug to engage and stop rotation of the wheel tire.

8. The apparatus of claim 7 wherein said first end of said tire gripper is connected to said main braces and said propeller arms at the pivotal connection therebetween.

9. The apparatus of claim 7 wherein said brake arms and said propeller bracket are pivotally connected together and to said tire gripper at said second end of said tire gripper.

10. The apparatus of claim 7 including stop brackets connected to the frame of the wheel chair limiting rotational movement of said combination main braces and propeller arms.

11. The apparatus of claim 7 including a pair of second main braces, a pair of second propeller lever arms, a second propeller handle, a second tire gripper, a second propeller bracket and a pair of second brake arms connected together as said first main braces, said first propeller lever arms, said first propeller handle, said first tire gripper, said first propeller bracket and said pair of first brake arms for propelling and braking a second wheel of the wheel chair.

* * * * *